(12) United States Patent
Vorlop et al.

(10) Patent No.: US 6,467,699 B1
(45) Date of Patent: Oct. 22, 2002

(54) METHOD AND DEVICE FOR PRODUCING SOLID PARTICLES FROM A LIQUID MEDIUM

(75) Inventors: Klaus-Dieter Vorlop; Ulf Pruesse; Juergen Breford, all of Braunschweig (DE)

(73) Assignee: Klaus-Dieter Vorlop, Braunschweig (DE)

( * ) Notice: Subject to any disclaimer, the term of this patent is extended or adjusted under 35 U.S.C. 154(b) by 0 days.

(21) Appl. No.: 09/647,800
(22) PCT Filed: Jan. 13, 2000
(86) PCT No.: PCT/DE00/00097
§ 371 (c)(1), (2), (4) Date: Oct. 5, 2000
(87) PCT Pub. No.: WO00/48722
PCT Pub. Date: Aug. 24, 2000

(30) Foreign Application Priority Data
Feb. 17, 1999 (DE) .......................................... 199 06 509

(51) Int. Cl.⁷ .............................................. B05B 17/00
(52) U.S. Cl. ...................................... 239/1; 239/214.13
(58) Field of Search ........................... 239/214, 214.13, 239/214.15, 225.1, 237, 251, 263, 1

(56) References Cited

U.S. PATENT DOCUMENTS

| | | | |
|---|---|---|---|
| 1,671,683 A | 5/1928 | Podszus | |
| 4,692,284 A | 9/1987 | Braden | 264/4.3 |

FOREIGN PATENT DOCUMENTS

| | | |
|---|---|---|
| DE | 22 18 113 | 10/1972 |
| DE | 38 36 894 | 5/1990 |
| DE | 44 24 998 | 2/1996 |
| DE | 197 55 353 | 4/1999 |

Primary Examiner—Lisa A. Douglas
(74) Attorney, Agent, or Firm—Foley & Lardner

(57) ABSTRACT

Economic production of solid particles from a liquid medium, which involves the liquid medium being formed as a cohesive liquid jet and being divided into defined sections (9') by a dividing device which is moved continuously in one direction in a cutting plane (8) is achieved, according to the invention, while minimizing cutting or spray losses caused by the dividing of the liquid jet (9), by the fact that a plurality of liquid jets (9) are provided, beneath which a common dividing device (5) is arranged, the liquid jets (9) being inclined with respect to the direction of movement of the dividing device (5) in such a way that each of the liquid jets (9) forms an acute angle ($\beta$) with the direction of movement of the dividing device (5).

13 Claims, 3 Drawing Sheets

METHOD AND DEVICE FOR PRODUCING SOLID PARTICLES FROM A LIQUID MEDIUM

The invention relates to a process for producing solid particles from a liquid medium, in which the liquid medium is formed into a liquid jet and is divided into defined sections in such a way that the sections continue to move in the direction of the liquid jet and enter an environment which brings about curing, and thus form the solid particles.

The invention also relates to a device for producing solid particles from a liquid medium, having a nozzle from which the liquid medium emerges as a cohesive liquid jet, having a dividing device, which is moved continuously in one direction in a cutting plane, for producing defined sections of the liquid jet, and having a collection vessel which is arranged in the direction of the liquid jet and is associated with a hardening device for the sections of the liquid jet.

The production of solid particles from a liquid medium is desirable in numerous applications. One significant application area is the encapsulation of chemically or biologically active materials in particles which are generally spherical and in which the chemical or biological activity of the material is maintained, yet the material, being encapsulated, can be handled so that it can be used and retrieved in a controlled manner, for example from a liquid. Suitable liquid media for forming spherical particles together with a hardening medium include ionically crosslinking gels, thermally crosslinking gels, polymer-containing liquids and similar systems. Examples of ionically crosslinking gels are sodium alginate, which sets immediately in a bath containing calcium ions, carrageenan, which hardens with potassium or potassium ions, etc. An example of a thermally crosslinking gel is agar agar, which hardens when the temperature falls considerably, so that the environment bringing about hardening simply has to exhibit a lower temperature in liquid or gas form. In other systems, crosslinking takes place at higher temperatures, so that drops in, for example, a falling tower simply have to be brought to a higher temperature for curing. Furthermore, the use of monomer liquids which together with a monomer polymerize in a hardening liquid or are excited to homopolymerization by the hardening medium is also known. Furthermore, curing by UV radiation is also known.

The production of the portions of liquid medium in a simple manner by controlled dropping from a nozzle cannot be used for commercial production, owing to the low throughputs. Furthermore, it is not possible for the droplets to be smaller than a relatively large minimum size.

It is known from DE 38 36 894 A1 for a larger number of nozzles to be arranged on a common nozzle carrier which is made to vibrate by a vibrator, so that the drops are detached from the nozzle earlier. In this way, it is possible to produce smaller drops. In the vibratory process, the minimum drop size—and therefore bead size—which can be achieved is dependent on the viscosity and the surface tension of the liquid medium. Therefore, any desirable reduction in the size of the substantially spherical particles cannot be achieved for media with a relatively high viscosity. Furthermore, the throughput of the liquid medium through the nozzles is limited unless considerable outlay involving a large number of nozzle apertures is accepted.

A dramatic improvement for the production of solid particles from a liquid medium is given by the abovementioned device which is known from DE 44 24 998 C2. In this device, a solid jet of liquid is formed, which is then subdivided into regular sections by a rapidly moving, preferably rotating dividing device. If the hardening device is situated at a certain distance from the dividing device, the surface tension of the liquid medium leads to the sections forming substantially spherical droplets, so that spherical beads are formed after curing. Since natural drop formation is no longer used, but rather the formation of drops is forced by the dividing device, it is possible to achieve a high throughput of material and, furthermore, to set any desired drop size.

The productivity of a device of this nature could be further optimized if the liquid is allowed to emerge from a plurality of nozzles in a plurality of liquid jets and can be divided by the dividing device which is common to all the nozzles, cured in a common hardening device and collected together.

The use of a rapidly moving dividing device leads to an intermediate section which substantially corresponds to the thickness of the dividing device, for example a rotating wire, being removed from the liquid jet. The material removed thus forms a cutting or spray loss, which should be minimized in order to improve the productivity of the device. Tests have shown that the cutting or spray loss is relatively high with a vertically positioned nozzle and a dividing device which has a horizontal cutting plane. Since the liquid in the liquid jet advances considerably during the cutting operation, i.e. passage of the dividing device through the cross section of the liquid jet, the intermediate section which is removed from the liquid jet does not correspond to a right-angled cylindrical section of the jet, but rather to a cylindrical jet section with inclined end faces, with the result that the volume of the intermediate section removed is increased considerably. It has therefore been proposed for the cutting plane of the dividing device to be inclined in accordance with the flow velocity of the liquid jet in order, in this way, to achieve a resultant rectangular cut through the liquid jet. However, an arrangement of this nature cannot readily be achieved with a large number of vertically positioned nozzles which are arranged, for example, on a common radius, since the angle required in each case can only be set at one location of the dividing-device cutting element, which revolves in an inclined plane.

The invention is based on the problem of improving a device of the type described in the introduction in terms of the liquid throughput which can be achieved and the solid particles which can be produced therewith and with a view to reducing the cutting or spray losses.

Working on the basis of this problem, a process of the type described in the introduction is characterized in that a plurality of liquid jets are formed, which are divided in the same direction of movement, and in that each of the liquid jets forms an acute angle with the direction of movement.

Accordingly, a device of the type described in the introduction, according to the invention, is characterized in that a plurality of nozzles are provided, beneath which a common dividing device is arranged, and in that the nozzles are inclined with respect to the direction of movement in such a way that each of the liquid jets emerging from the nozzles forms an acute angle with the direction of movement of the dividing device.

In contradistinction to the known systems of the generic type, in which the nozzles were always aligned in the vertical, so that a liquid jet falling straight down was formed, the nozzles according to the invention are inclined with respect to the vertical. This makes it possible for the resultant cutting path of the dividing device through the liquid jets to run perpendicular to the longitudinal direction of the liquid jet in the cutting plane, and all the nozzles can be at the same distance from the cutting plane.

Since the optimum angle between liquid jet and direction of movement is in any case dependent on the flow velocity of the liquid jet, it is expedient if the inclination of the nozzles is adjustable.

To remove a minimum intermediate section in order to separate the defined sections of the liquid jet, the nozzles may be oriented perpendicular to the cutting plane in the direction running perpendicular to the direction of movement of the dividing device.

It is particularly preferable if the dividing device can be moved in rotation and the nozzles are arranged on the same radius with respect to the rotation axle. The direction of movement in which the dividing device moves continuously is therefore a circular path and, for each cut through a liquid jet, is defined by the relevant tangent on the circular path. Alternatively, it is also possible for cutting elements of the dividing device to be moved substantially in translation, for example as wires clamped in a revolving conveyor, in which case only the carrying section or the return section of this conveyor is used for the cutting operation.

The device according to the invention may expediently be accommodated in a sealed housing, so that the entire arrangement can also be sterilized and can be sterile-sealed, in order to satisfy any demands made in terms of particularly clean and, if appropriate, sterile manufacture. It is therefore readily possible to comply with the cGMP-FDA requirements.

In the device according to the invention, it may be expedient for some of the nozzles, that is to say at least one nozzle, to be designed as a cleaning nozzle which is fed with a cleaning liquid. The cleaning liquid prevents encrustation on the cutting tools and may be designed in such a way that the curing operation is not interfered with even when a curing liquid is being used.

The invention is to be explained in more detail below with reference to exemplary embodiments illustrated in the drawing, in which.

Figure 1:
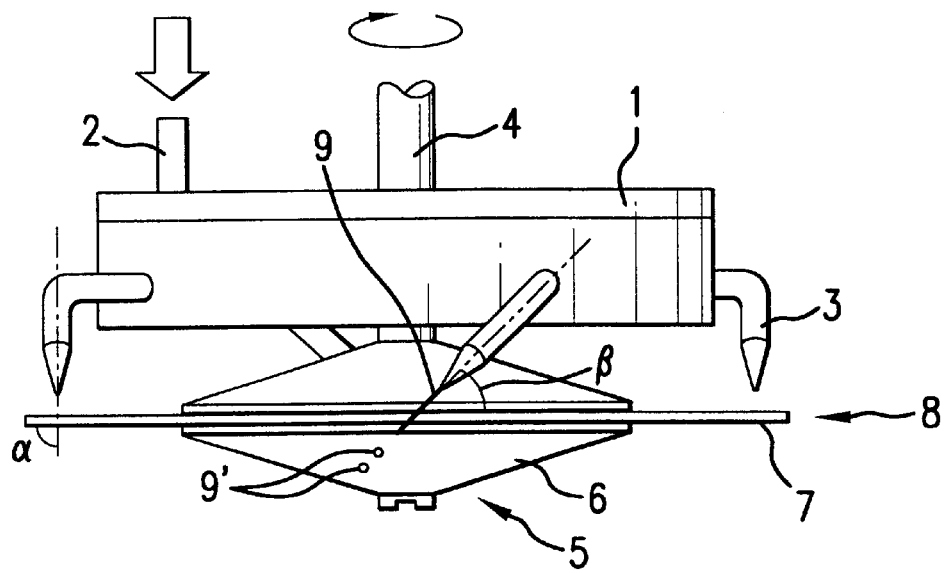
FIG. 1 shows a diagrammatic side view of part of the device according to the invention, with nozzles and dividing device.
Figure 2:
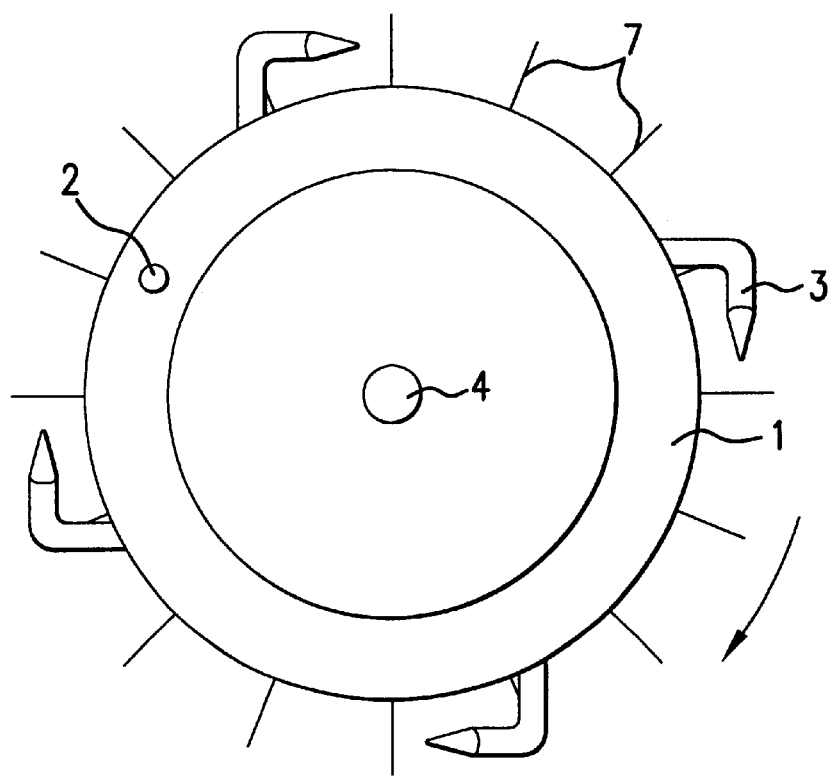
FIG. 2 shows a diagrammatic plan view of the arrangement shown in FIG. 1.

FIGS. 1 and 2 diagrammatically illustrate a storage vessel 1 for a liquid medium, which can be filled with the liquid medium via a feed port 2. The storage vessel 1 is designed as a cylinder which is circular in cross section. Four nozzles 3 are fitted to its cylindrical outer surfaces, which nozzles have an angled-off nozzle body and initially extend in the radial direction of the cylinder of the storage vessel 1 and are then angled off obliquely downward. The nozzles 3 are special solid-jet nozzles which ensure that a solid liquid jet is formed over a certain minimum length.

The storage vessel 1 has a central passage opening for a drive shaft 4 which drives a dividing device 5 in rotation, specifically in the clockwise direction as seen from the drive shaft 4. The dividing device 5 comprises a rotating central body 6, in which thin wires 7 are clamped, which wires, in the event of rapid rotation of the center body 6, stand out in the radial direction in a horizontal cutting plane 8, due to the centrifugal force, and thus form cutting elements in the horizontal cutting plane 8, or project in the radial direction by dint of their own stability or additional clamping.

The nozzles 3 are aligned perpendicular to the direction of movement (tangent direction), i.e. at right angles in the diametral direction of the movement circle of the wires 7, as illustrated in FIG. 1 by the right angle $\alpha$ which is drawn in. The nozzles each form an acute angle $\beta$, which in the exemplary embodiment illustrated is approximately 45°, with the direction of movement, that is to say the tangent of the circular movement. The size of angle $\beta$ which is required in order to realize a minimum cutting path of the wires 7 through the liquid jet 9 emerging from the nozzles 3, and therefore a minimal intermediate section volume caused by the cutting operation, is dependent on the flow velocity in the liquid jet 9, so that it is expedient for the angle $\beta$ of the nozzles 3 to be made adjustable, in order to enable the device to be adapted to different liquid media.

FIG. 2 also shows that the nozzles 3, in plan view, are directed tangentially with respect to the movement circle of the wires 7, which is expedient in order to minimize the cutting volume in the liquid jet 9.

Figure 3:
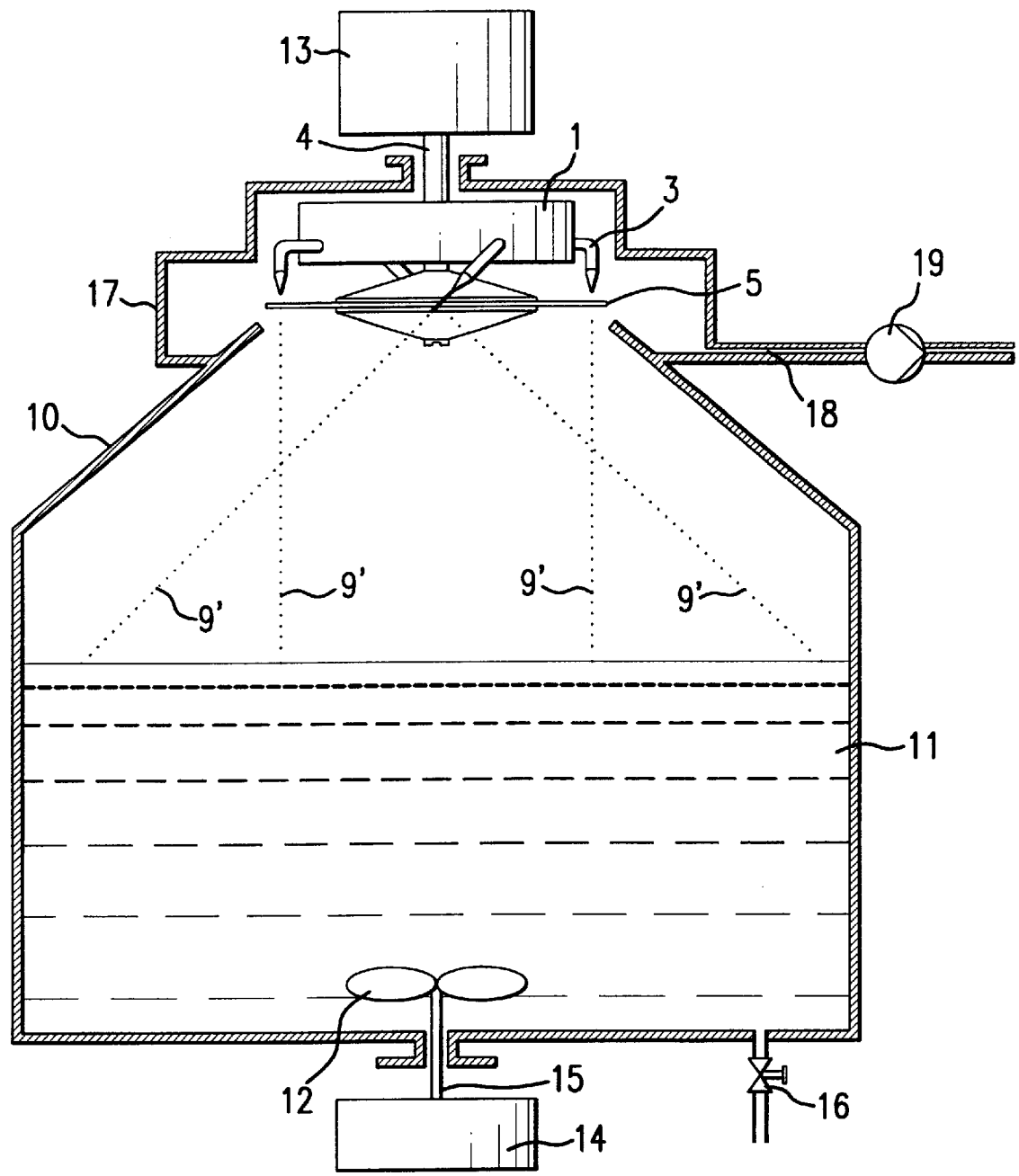
FIG. 3 shows a diagrammatic illustration of an entire device according to the invention, which is accommodated in a housing in order to allow sterile manufacture.

FIG. 3 shows that the storage vessel 1 with the nozzles and the dividing device 5 are accommodated in a common housing 10 which at the same time serves as a collection device for the liquid jets 9' which have been divided by the dividing device 5 and for this purpose is filled with a reaction liquid 11 which leads to curing of the sections of the liquid jets 9', which, due to the surface tension, have been shaped into drops. At the bottom of the vessel 10 there is a stirring device 12. A drive motor 13 for the dividing device 5 and a drive motor 14 are arranged outside the housing 10. The drive motor 14 is connected to the stirring device 12 via a drive shaft 15. The drive shafts 4 and 15 are guided in a sealed manner through the appropriate wall of the housing 10.

At the bottom of the vessel 10 there is an outlet valve 16, via which the reaction liquid 11 and the cured particles can be removed.

Radially with respect to the dividing device 5 there is a housing attachment 17, into which the intermediate sections which are removed from the liquid jets 9 by the dividing device 5 are thrown. The material of the intermediate sections 5 collects in a bottom outlet line 18 and is returned to the storage vessel 1 by a pump 19.

Figure 4:
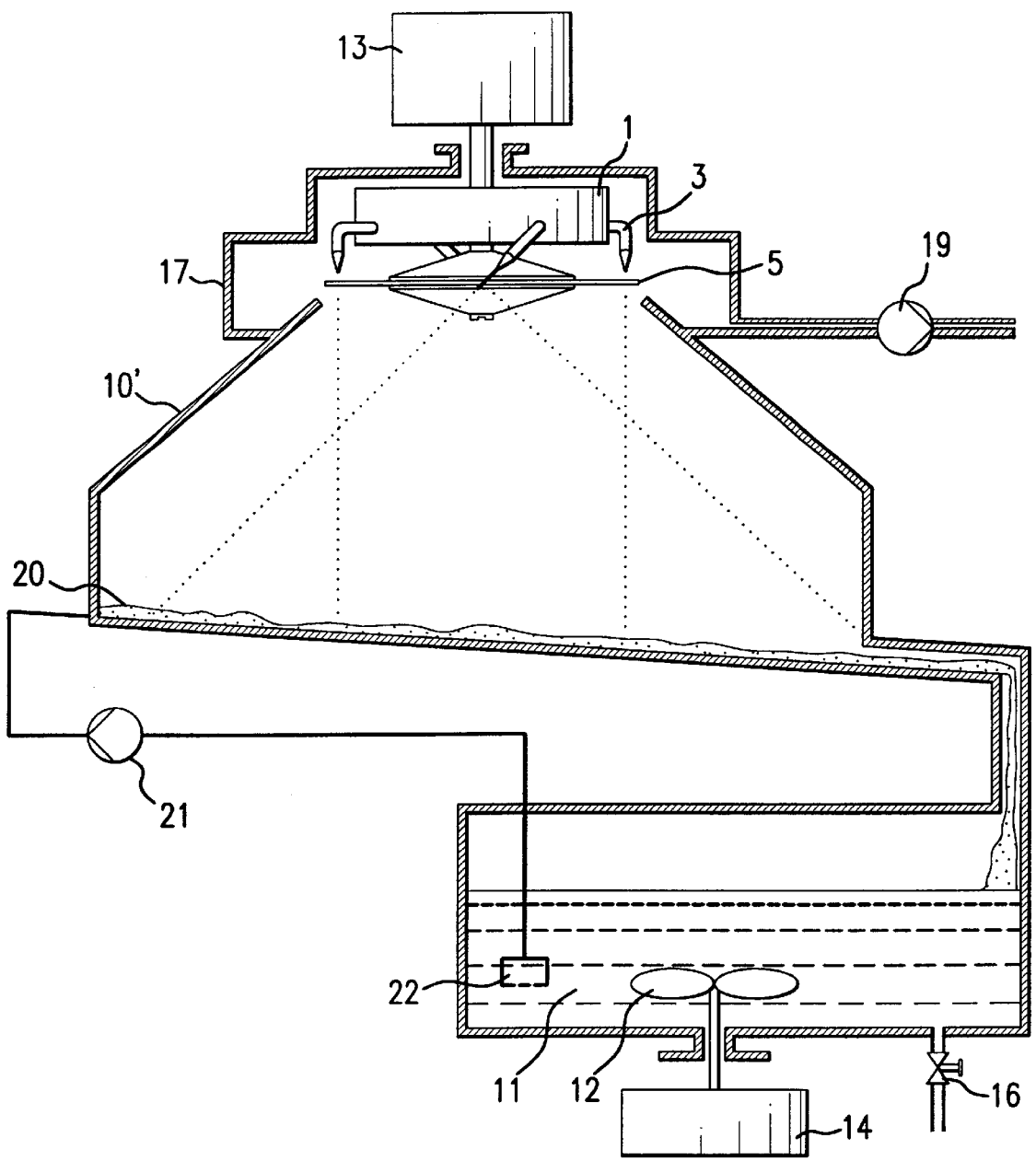
FIG. 4 shows a diagrammatic illustration corresponding to FIG. 3, with a modified collection and hardening device.

In the exemplary embodiment illustrated in FIG. 4, the vessel 10' is provided with an inclined base 20 which is provided with a film of the reaction liquid 11 via a circulation pump 21, so that curing of the particles takes place as early as on the inclined base 20. At the end of the inclined base 20 there is a drop into the reaction liquid 11, so that the cured particles formed can harden further in the reaction solution 11. A filtering screen 22 in an intake line of the circulation pump 21 prevents cured particles from being sucked into the circulation pump 21. The inclined base 20 has the effect of causing the sections 9' to cure in the reaction liquid 11 on the inclined base 20 after a droplet has been formed and immediately being removed via the drop. This prevents subsequent sections 9' from hitting particles which have already partially cured and are floating in the reaction solution 11, thus forming a plurality of stuck-together particles.

The device according to the invention enables a large number of nozzles 3 to be used; this large number may be considerably greater than the four nozzles 3 illustrated. In this way, the production of cured particles can be carried out highly efficiently, with only a single dividing device 5 and a single collection device (vessel 10, 10') and hardening device (reaction solution 11) being required. The inclined nozzles 3 enable the reduction in efficiency caused by cutting or spray losses to be minimized. The reduction in the cutting or spray losses by the inclined nozzles 3 according to the invention has been demonstrated on the basis of an experimental example.

A solution of 12 g polyvinyl alcohol (PVAL 1098), 10 g glycerol and 90 g water was used as the test solution. The equipment used had a diameter for the aperture of the nozzles 3 of 0.3 mm and a diameter of the wires 7 of the dividing device 5 of 400 µm. The number of wires was 48. The central body 6 was rotating at a rotational speed of 6000 rpm, and the distance of the liquid jet 9 from the drive shaft 4 was 32 mm. The ratio of the rotational speed of the wires and the flow velocity of the liquid was 1.

With a conventionally arranged nozzle in a vertical position and a horizontal cutting plane 8, the cutting or spray losses amounted to 27%. By contrast, with nozzles 3 inclined by 45° in accordance with the present invention, the losses were only 12%. The diameter of the beads formed was 0.5 mm.

The particle diameters which can preferably be produced using the device according to the invention are between 0.5 and 1.5 mm. Particularly economical throughput of the liquid jets 9 can be achieved for particle diameters of this size.

In the exemplary embodiments illustrated, the dividing device 5 is formed from a rotating central body 6 and thin wires 7 which start from this central body 6. At their ends which are shown to be free in the drawing, the thin wires 7 may also be connected to one another by means of an outer ring, which stabilizes the arrangement of the wires 7.

The arrangement of the nozzles 3, which in the exemplary embodiments illustrated are vertically oriented, may also involve a horizontal orientation, so that the liquid jets 9 leave the nozzles 3 in the horizontal direction, for example. In this case, the dividing device 5 may also be formed by vertically positioned wires which are clamped between an upper and a lower ring, the cutting plane of the wires being formed by a cylindrical lateral surface, and the liquid jets 9 forming the acute angle β at the intersection with respect to the tangent of the lateral surface.

The device according to the invention is also suitable for processing molten materials as liquid medium which cure by cooling.

What is claimed is:

1. Process for producing solid particles from a liquid medium, in which the liquid medium is formed into a liquid jet which moves in a certain direction and is divided into defined sections in such a way that the sections continue to move in the direction of the liquid jet and enter an environment which brings about curing, and thus form the solid particles, wherein a plurality of liquid jets are formed which have a pre-determined flow velocity and which are divided in a same direction of movement, and each of the liquid jets forms an acute angle (β) with the direction of movement, which angle is set with respect to the pre-determined flow velocity in such a way that the resultant cutting path through the liquid jet runs perpendicular to the direction of the liquid jet.

2. Process for producing solid particles from a liquid medium, in which the liquid medium is formed into a liquid jet which moves in a certain direction and is divided into defined sections in such a way that the sections continue to move in the direction of the liquid jet and enter an environment which brings about curing, and thus form the solid particles, wherein a plurality of liquid jets are formed which are divided in a same direction of movement, each of the liquid jets forms an acute angle (β) with the direction of movement, the liquid jets are divided by a dividing device moving in the direction of movement, and the liquid jets in a direction running perpendicular to the direction of movement of the dividing device are oriented perpendicular to a cutting plane in which the direction of movement run.

3. Process according to claim 2, wherein the direction of movement for the dividing device lie on a circular path.

4. Device for producing solid particles from a liquid medium, having a nozzle from which the liquid medium emerges as a cohesive liquid jet, having a dividing device, which is moved continuously in one direction in a cutting plane, for producing defined sections of the liquid jet, and having a collection vessel which is arranged in the direction of the liquid jet and is associated with a hardening device for the sections of the liquid jet, wherein a plurality of nozzles are provided, beneath which a common dividing device is arranged, and in that the nozzles are inclined with respect to the direction of movement in such a way that each of the liquid jets emerging from the nozzles forms an acute angle (β) with the direction of movement of the dividing device.

5. Device according to claim 4, wherein storage vessel, dividing device, hardening device and collection vessel are accommodated in a sealed housing.

6. Device according to claim 4, wherein the acute angle (β) is set in such a way with respect to a set flow velocity of this liquid jet that the resultant cutting path through the liquid jet runs perpendicular to the longitudinal direction of the liquid jet in the cutting plane.

7. Device according to claim 4, wherein the nozzles are adjustable with respect to their inclination relative to the direction of movement.

8. Device according to claim 4, wherein the nozzles are oriented perpendicular to the cutting plane in the direction running perpendicular to the direction of movement of the dividing device.

9. Device according to claim 4, wherein the dividing device can move in rotation, and in that the nozzles are arranged on the same radius with respect to the rotation axle.

10. Device according to claim 4, wherein the nozzles are at an identical distance from the cutting plane.

11. Device according to claim 4, wherein the cutting plane is arranged horizontally.

12. Device according to claim 4, wherein the nozzles are designed as angled-off radial extensions of the centrally arranged storage vessel.

13. Device according to claim 4, wherein the housing can be sterilized and can be sterile-sealed.

* * * * *